(12) United States Patent
Bland et al.

(10) Patent No.: US 8,621,011 B2
(45) Date of Patent: Dec. 31, 2013

(54) TREATMENT OF WEB FEEDS AS WORK ASSIGNMENT IN A CONTACT CENTER

(75) Inventors: Michael Alan Bland, Boulder, CO (US); Daniel K. Burgin, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 302 days.

(21) Appl. No.: 12/464,659

(22) Filed: May 12, 2009

(65) Prior Publication Data
US 2010/0293560 A1    Nov. 18, 2010

(51) Int. Cl.
*G06F 15/16* (2006.01)
(52) U.S. Cl.
USPC .......................... 709/206; 709/207; 709/224
(58) Field of Classification Search
USPC .................. 709/200, 206–207, 224
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,777,469 A | 10/1988 | Engelke et al. | |
| 4,797,911 A | 1/1989 | Szlam et al. | |
| 4,894,857 A | 1/1990 | Szlam et al. | |
| 4,897,868 A | 1/1990 | Engelke et al. | |
| 4,953,159 A | 8/1990 | Hayden | |
| 4,959,847 A | 9/1990 | Engelke et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

U.S. Appl. No. 12/270,443, filed Nov. 13, 2008, Kohler et al.

(Continued)

*Primary Examiner* — Patrice Winder
*Assistant Examiner* — Eyob Hagos
(74) *Attorney, Agent, or Firm* — Sheridan Ross P.C.

(57) ABSTRACT

To provide an enhanced customer service experience, various combinations of web searches, site-specific filtering tools and syndicated feed readers can be used to find relevant posts on the internet. Internal email, IM, phone, and the like can cooperate with an appropriately equipped expert-finding solution to assist with help in locating the experts qualified to respond to the post(s). The leveraging of RSS/Atom feeds or similar technology, content analysis, and contact center work distribution algorithms are leveraged to monitor the feeds from multiple sites and automatically distribute messages to appropriately skilled contact center agents. Each message discovered is analyzed to determine which contact center queue it is to be routed to, and then the contact center assigns it to an appropriate agent. This eliminates or significantly reduces the amount of manual searching and qualification of posts.

20 Claims, 4 Drawing Sheets

(56) References Cited

U.S. PATENT DOCUMENTS

| | | |
|---|---|---|
| 5,325,417 A | 6/1994 | Engelke et al. |
| 5,327,479 A | 7/1994 | Engelke et al. |
| 5,335,268 A | 8/1994 | Kelly, Jr. et al. |
| 5,335,269 A | 8/1994 | Steinlicht |
| 5,351,288 A | 9/1994 | Engelke et al. |
| 5,390,243 A | 2/1995 | Casselman et al. |
| 5,432,837 A | 7/1995 | Engelke et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| D364,865 S | 12/1995 | Engelke et al. |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,581,593 A | 12/1996 | Engelke et al. |
| 5,592,378 A | 1/1997 | Cameron et al. |
| 5,592,542 A | 1/1997 | Honda et al. |
| 5,594,726 A | 1/1997 | Thompson et al. |
| 5,604,786 A | 2/1997 | Engelke et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,653,242 A | 8/1997 | Brockelsby |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,724,405 A | 3/1998 | Engelke et al. |
| 5,740,238 A | 4/1998 | Flockhart et al. |
| 5,742,675 A | 4/1998 | Kilander et al. |
| 5,745,711 A | 4/1998 | Kitahara et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,809,425 A | 9/1998 | Colwell et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,862,519 A | 1/1999 | Sharma et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,482 A | 6/1999 | Engelke et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,116 A | 10/1999 | Engelke et al. |
| 5,974,135 A | 10/1999 | Breneman et al. |
| 5,974,462 A | 10/1999 | Aman et al. |
| 5,978,654 A | 11/1999 | Colwell et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,075,841 A | 6/2000 | Engelke et al. |
| 6,075,842 A | 6/2000 | Engelke et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,314 B1 | 5/2001 | Engelke |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,066 B1 | 7/2001 | Shtivelman et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,307,921 B1 | 10/2001 | Engelke et al. |
| 6,353,810 B1 | 3/2002 | Petrushin |
| 6,356,632 B1 | 3/2002 | Foster et al. |
| 6,356,633 B1 * | 3/2002 | Armstrong ............... 379/265.11 |
| 6,366,658 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |

(56) References Cited

U.S. PATENT DOCUMENTS

| | | | |
|---|---|---|---|
| 6,490,350 B2 | 12/2002 | McDuff et al. | |
| 6,493,426 B2 | 12/2002 | Engelke et al. | |
| 6,510,206 B2 | 1/2003 | Engelke et al. | |
| 6,535,600 B1 | 3/2003 | Fisher et al. | |
| 6,535,601 B1 | 3/2003 | Flockhart et al. | |
| 6,549,611 B2 | 4/2003 | Engelke et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,567,503 B2 | 5/2003 | Engelke et al. | |
| 6,594,346 B2 | 7/2003 | Engelke et al. | |
| 6,597,685 B2 | 7/2003 | Miloslavsky et al. | |
| 6,603,835 B2 | 8/2003 | Engelke et al. | |
| 6,614,903 B1 | 9/2003 | Flockhart et al. | |
| 6,650,748 B1 | 11/2003 | Edwards et al. | |
| 6,697,457 B2 | 2/2004 | Petrushin | |
| 6,704,409 B1 | 3/2004 | Dilip et al. | |
| 6,707,903 B2 | 3/2004 | Burok et al. | |
| 6,714,976 B1 | 3/2004 | Wilson et al. | |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,816,468 B1 | 11/2004 | Cruickshank | |
| 6,882,707 B2 | 4/2005 | Engelke et al. | |
| 6,934,366 B2 | 8/2005 | Engelke et al. | |
| 6,947,543 B2 | 9/2005 | Alvarado et al. | |
| 7,003,082 B2 | 2/2006 | Engelke et al. | |
| 7,006,604 B2 | 2/2006 | Engelke et al. | |
| 7,035,927 B2 | 4/2006 | Flockhart et al. | |
| 7,088,812 B1 | 8/2006 | Atwood et al. | |
| 7,133,513 B1 | 11/2006 | Zhang | |
| 7,162,471 B1 * | 1/2007 | Knight et al. | 707/750 |
| 7,236,580 B1 | 6/2007 | Sarkar et al. | |
| 7,673,327 B1 * | 3/2010 | Polis et al. | 726/5 |
| 2002/0055950 A1 | 5/2002 | Witteman | |
| 2002/0087579 A1 | 7/2002 | Chasanoff et al. | |
| 2002/0124051 A1 | 9/2002 | Ludwig et al. | |
| 2002/0124053 A1 | 9/2002 | Adams et al. | |
| 2002/0194002 A1 | 12/2002 | Petrushin | |
| 2003/0038754 A1 | 2/2003 | Goldstein et al. | |
| 2003/0126141 A1 | 7/2003 | Hassman et al. | |
| 2003/0167276 A1 | 9/2003 | Simpson et al. | |
| 2003/0174826 A1 | 9/2003 | Hesse | |
| 2003/0174830 A1 | 9/2003 | Boyer et al. | |
| 2003/0177017 A1 | 9/2003 | Boyer et al. | |
| 2003/0227478 A1 * | 12/2003 | Chatfield | 345/751 |
| 2004/0002049 A1 | 1/2004 | Beavers et al. | |
| 2004/0058694 A1 * | 3/2004 | Mendiola et al. | 455/466 |
| 2004/0081293 A1 | 4/2004 | Brown et al. | |
| 2004/0125932 A1 | 7/2004 | Orbach et al. | |
| 2004/0199580 A1 | 10/2004 | Zhakov et al. | |
| 2004/0203878 A1 | 10/2004 | Thomson | |
| 2005/0084086 A1 | 4/2005 | Hesse | |
| 2005/0188412 A1 | 8/2005 | Dacosta | |
| 2005/0232169 A1 | 10/2005 | McLaughlin et al. | |
| 2005/0283752 A1 | 12/2005 | Fruchter | |
| 2006/0149815 A1 | 7/2006 | Spradling et al. | |
| 2007/0033003 A1 | 2/2007 | Morris | |
| 2007/0118433 A1 | 5/2007 | Bess | |
| 2007/0127645 A1 | 6/2007 | Bloebaum et al. | |
| 2007/0195940 A1 | 8/2007 | Miloslavsky et al. | |
| 2007/0244895 A1 | 10/2007 | Mohler et al. | |
| 2007/0294281 A1 * | 12/2007 | Ward et al. | 707/102 |
| 2007/0299838 A1 | 12/2007 | Behrens | |
| 2008/0005072 A1 | 1/2008 | Meek et al. | |
| 2008/0005249 A1 | 1/2008 | Hart | |
| 2008/0062895 A1 | 3/2008 | Chapman et al. | |
| 2008/0147722 A1 | 6/2008 | Dolin et al. | |
| 2008/0215614 A1 | 9/2008 | Slattery | |
| 2009/0327115 A1 * | 12/2009 | Schilder et al. | 705/35 |
| 2010/0080378 A1 | 4/2010 | Katz | |
| 2010/0121672 A1 | 5/2010 | Kohler et al. | |

FOREIGN PATENT DOCUMENTS

| | | |
|---|---|---|
| EP | 0469663 | 2/1992 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 0899952 | 3/1999 |
| EP | 998108 | 5/2000 |
| EP | 1091307 | 4/2001 |
| EP | 1150236 | 10/2001 |
| EP | 1288795 | 3/2003 |
| GB | 2273418 | 6/1994 |
| GB | 2290192 | 12/1995 |
| JP | 2000-516432 | 12/2000 |
| JP | 2001-184275 | 7/2001 |
| JP | 2006-244102 | 9/2006 |
| WO | WO 96/07141 | 3/1996 |
| WO | WO 97/28635 | 8/1997 |
| WO | WO 98/56207 | 12/1998 |
| WO | WO 2005/017674 | 2/2005 |
| WO | WO 2006/078683 | 7/2006 |
| WO | WO 2009/041982 | 4/2009 |

OTHER PUBLICATIONS

U.S. Appl. No. 12/241,988, filed Sep. 30, 2008, Katz.
U.S. Appl. No. 12/389,240, filed Feb. 19, 2009, Gartner.
U.S. Appl. No. 12/372,903, filed Feb. 18, 2009, Erhart et al.
Binhammer, Richard "In Depth: Dell" Dell, Inc., http://blog.fluentsimplicity.com/twitter-brand-index/dell/, Aug. 2008, pp. 1-3.
Eliason, Frank "Background Noise: Musings on Internet Media, Technology, and Pretty Much Whatever Else I Feel Like" http://kzimmerman.typepad.com/background_noise/2008/04/dear-comcast-i.html, Apr. 7, 2008, pp. 1-3.
"The Communications Factors: Comcast is Taking the First Step in the Relationship Economy" http://onthemarkwriting.com/2008/02/20/comcast-is-taking-the-first-step-in-the-relationship-economy/, Feb. 20, 2008, pp. 1-3.
Perez, Sara "Read Write Web: How to Get Customer Service Via Twitter" http://www.readwriteweb.com/archives/how_to_get_customer_service_via_twitter.php, Apr. 10, 2008, pp. 1-14.
Alston, David "Consumers are Shouting into your Brand's "Social Phone"" http://www.radian6.com/blog/76/comsumers-are-shouting-into-your-band's-%22social-phon%22/, Aug. 19, 2008, pp. 1-2.
"Answering the Social Phone" Media Philosopher, http://www.mediaphilosopher.com/2008/04/14/answering-the-social-phone/, Apr. 14, 2008, pp. 1-6.
Ives, Bill "Radian6—Monitoring Social Media" The {App} Gap, http://www.theappgap.com/radian6—monitoring-social-meida.html, Nov. 10, 2008, pp. 1-14.
Radian⁶ company website, http://www.radian6.com/cms/home.
"Welcome to the Service Cloud" salesforce.com, Copyright 2000-2009.
Extended European Search Report for European Patent Application No. 10162570.5, dated Jul. 6, 2010.
Official Action for European Patent Application No. 10162570.5, dated Oct. 20, 2011.
U.S. Appl. No. 11/395,558, filed Mar. 30, 2006, Mazza et al.
U.S. Appl. No. 12/540,202, filed Aug. 12, 2009, Gartner et al.
"http://en.wikipedia.org/wiki/Conference_Call, Wikipedia, Feb. 25, 2009, Publisher, Wikimedia Foundation, Inc., Published in US".
http://en.wikipedia.org/wiki/Web_conferencing, Wikipedia, Feb. 25, 2009, Publisher: Wikimedia Foundation, Inc., Published in US.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.

(56) References Cited

OTHER PUBLICATIONS

"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-Athena, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
"Word Frequencies in Written and Spoken English" (Andrew Wilson, Geoffery Leech, Paul Rayson, ISBN 0582-32007-0, Prentice Hall, 2001.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
AT&T The 8400-Series Voice Terminals; Instructions for Installation, Switch Administration, and Programming the Options; Issue 2, Jan. 1996; 91 pages.
Avaya 5400 Series Digital Telephones Fact Sheet; 2 pages.
Avaya 5400 Series Digital Telephones Product Features Sheet; 4 pages.
Avaya Digital & IP Telephones Fact Sheet; 2 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
Damerau, Fred, "Generating and evaluation domain-oriented multiword terms from texts," Information Processing and Management 29(4):433-447, 1993.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.
Foster, Robin, et al., "Avaya Business Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources, 1998, 6 pages.
http://supportavaya.com/japple/css/japple?PAGE+ProductIndex; printed Mar. 17, 2006; 11 pages.
http://wvvvv.avaya.com/gcm/master-usa/en-us/products/offers/5400_series_digital_telephone.htm&View=ProdDesc; printed Mar. 17, 2006; 2 pages.
http://www.captionedtelephone.com/faqs.phtml; printed Feb. 24, 2006; 6 pages.
http://www.captionedtelephone.com/how-it-works.phtml; printed Feb. 24, 2006; 2 pages.
http://wvvw.ultratec.com/captel/; printed Feb. 24, 2006; 2 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Presentation by Victor Zue, The MIT Oxygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
The 6402 and 6402D Telephones Instruction Sheets; 20 pages.
Official Action (with English translation) for Chinese Patent Application No. 1020101765002 dated Jan. 21, 2013, 15 pages.
Official Action (with partial English translation) for Japanese Patent Application No. 2010-109359 dated Jun. 12, 2013, 6 pages.

* cited by examiner

TREATMENT OF WEB FEEDS AS WORK ASSIGNMENT IN A CONTACT CENTER

FIELD OF THE INVENTION

One exemplary aspect of the present invention is directed toward communications, and more specifically toward addressing questions/comments posted on the Internet in a contact center. Even more particularly, one exemplary aspect is directed toward routing to one or more customer service agents questions/comments from web feeds that are distributed via work assignments to one or more queues in a contact center such that the questions/comments can be addressed.

BACKGROUND OF THE INVENTION

Some companies assign resources to monitor blogs, Twitter®, discussion forums related to the company's products and services, etc. Some have established a presence on Facebook® with someone assigned to monitor it. Even company-sponsored forums require someone to actively monitor them. There are multiple ways to monitor these sites for activity related to a company and its products and services:
1. Use each site's primary web interface. This can be time consuming as it requires manually browsing the site, perhaps using search features, with each site presenting a different user experience.
2. Use tools provided by or for each site to filter content. Twitter® in particular has an active third party developer base that uses the Twitter® API to find content of interest, such as tweetScan®. This may allow automating of some of the search capabilities, but it is specific to the Twitter® site, so different tools with different capabilities would be used.
3. Many websites (blogs, discussion forums, Twitter®) provide feeds using RSS or Atom, so a person monitoring more than one service might use a feed reader, and then manually search for posts that require a response and forward them to an appropriate company representative. Filtering capabilities in the feed reader may be used to further identify specific posts that require attention.
4. Use a general tool such as Google® Alerts®, which monitors many web sources (e.g., news, web, blogs, video, groups . . . ) for specified search terms and deliver the results as an email or RSS/Atom feed. This is similar to No. 3 above, but it does not currently support Twitter® and may not monitor every blog of interest. Mysyndicaat.com is a similar service that aggregates content from websites, discussion forums and blogs based on keyword searches and provides the output in a viewer page or as an RSS/Atom feed.

SUMMARY OF THE INVENTION

With the emergence of Web 2.0, traditional customer service channels are being bypassed as people seek assistance through the web using unsponsored message forums, blogs, Twitter®, Facebook®, GetSatisfaction®, and the like. Questions and complaints about a company's products and services may go unnoticed by a company because the company is not paying attention to these "Customer Service 2.0" channels.

Unlike a company sponsored site, which may categorize posts based on specific products and services, posts discovered by the above techniques will typically not be categorized by the user—the end user may just enter a complaint or question about the company on Twitter® or GetSatisfaction®. The company representative who discovers that comment will need to analyze it to determine if it needs a response, and determine who in the company is best qualified to provide that response, usually through an email or IM. The responder then needs to get the response back onto the source site where the comment was originally discovered. This may require a lot of coordination between the people assigned to monitor the Internet for the company, and the people qualified to address specific questions and complaints.

Accordingly, in accordance with one exemplary aspect of the present invention, various combinations of web searches, site-specific filtering tools and syndicated feed readers can be used to find relevant posts. Internal email, IM, phone, and the like can cooperate with an appropriately equipped expert-finding solution to assist with help in locating the experts qualified to respond to the post(s).

In accordance with another exemplary embodiment, the leveraging of RSS/Atom fees or similar technology, content analysis, and contact center work distribution algorithms are leveraged to monitor the feeds from multiple sites and automatically distribute messages to appropriately skilled contact center agents. Each message discovered is analyzed to determine which contact center queue it is to be routed to, and then the contact center assigns it to an appropriate agent. This eliminates or significantly reduces the amount of manual searching and qualification of posts.

RSS/Atom offers some advantages because the vast majority of social networking sites publish RSS or Atom feeds, so a generic implementation would work with the majority of sites. However, a typical embodiment could also provide a connector to a specific site that has a published API, either because that site does not provide an RSS/Atom feed, or the API includes a richer amount of data that could enhance the data gathered.

In accordance with another exemplary embodiment, a number of feeds could be aggregated into a rules-based analysis engine, which filters the individual messages and routes them to one or more contact center queues. Different queues may be targeted depending on which products or services were mentioned, or whether the post appears to be a complaint vs. a complement that may require a different response priority or special skills. Different queues may be targeted based on the source type: for example, one set of agents could be trained to monitor Twitter® and blogs, while another monitors Facebook®. Another queue may direct those messages that mention a specific well-known bug to an automated agent that replies with the fix, or the like.

The analysis engine would look for duplicate posts (such as the same person making the same complaint on multiple forums) and apply appropriate treatment, e.g., ignore the duplicates, or treat it as a higher priority, and ensure a single response gets to all the sources.

The analysis engine could discard messages that appear to not require a response, for example, posts that refer to a company news article without any significant additional content.

In accordance with another exemplary embodiment, speech analysis and speech-to-text could be leveraged to monitor podcasts, YouTube® videos and the like. These tools could be used to discover what people are saying about a particular company, in those media, and route them to contact center agents (optionally along with the corresponding text) as appropriate.

Using contact center technology also includes the use of contact center reporting and analytics to measure effectiveness of feed monitoring. Reports could show how and where a company's name and products are being mentioned, and how responsive agents are at responding to those posts. Various metric-based reports could then be generated based on an analysis of these factors.

One exemplary advantage of an embodiment of this invention is it allows the elimination of manual monitoring of multiple web sites and feeds. Discovery of messages and initial qualification can be automated, with contact center technology utilized to find the best responder. Reporting and analytics can allow measuring of the effectiveness of the monitoring of the various feeds.

In accordance with another exemplary embodiment, RSS/Atom or similar automated data feeds are used as sources into a contact center, allowing messages discovered around the Internet to be assigned to an appropriate agent, i.e., customer service agent and/or automatic response agent. Aggregation of feeds and content for speech analysis can be used to facilitate these actions.

Additional aspects of the invention relate to aggregating information posted on the Internet, optionally via one or more RSS feeds/Atom feeds, and filtering this information to determine whether an entity should engage in posting a follow-up post.

Additional aspects of the invention relate to analyzing, with for example, the assistance of one or more of artificial intelligence, a neural network, and fuzzy logic, to determine whether a question/comment posted on the Internet requires a response.

Additional aspects of the invention relate to a Customer Service 2.0 environment where an interaction center manages Internet posts to determine if a response is required.

Additional aspects of the invention further relate to providing questions/comments posted on the network to one or more of a customer service agent and an auto response module.

Even further aspects of the invention relate to automatically determining whether a question/comment has already received a response and optionally reposting a previously generated answer.

Even further aspects of the invention relate to automatically identifying one or more sources of information on the Internet for inclusion into an aggregator.

Even further aspects of the invention relate to using one or more tools to search for a specific keyword(s) for use with the Customer Service 2.0 application described herein.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures, wherein.

DETAILED DESCRIPTION OF THE INVENTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide responses to internet posts. For example, the systems and methods disclosed herein will also work well with SIP-based communications systems and endpoints. Moreover, various endpoints usable with the present invention can be any communications device such as a PC, telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
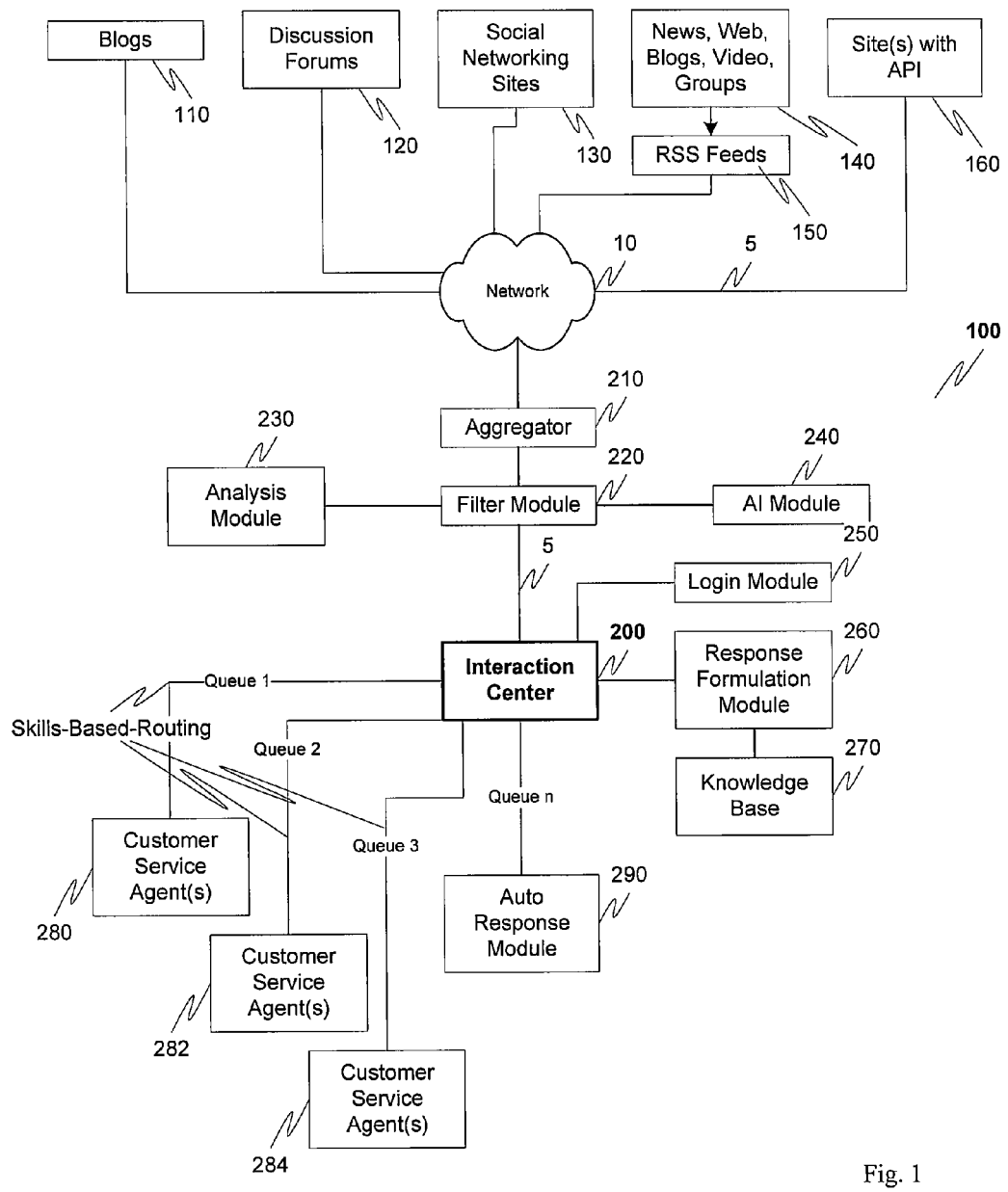
FIG. 1 illustrates an exemplary communications system according to this invention.

FIG. 1 illustrates an exemplary communications system according to this invention. The communications system 100, in addition to conventional and well-known components, includes one or more web resources, such as blogs 110, discussion forums 120, social networking sites 130, news, web, blogs, video and group feeds 140, and one or more sites that have dedicated APIs 160. Each of these resources can be associated with, for example, an RSS/Atom feed 150, or comparable technology that allows the feeding or forwarding of frequently updated works. A typical RSS enabled document or site, which is also known as a web feed or channel, can include full or summarized text, plus metadata associated with a particular feed. In general, information such as questions and comments can be derived from any of the above information sources, and in general from any endpoint(s) on the Internet including mash ups, portals, wikis, user-generated content, consumer-generated media, social media, industrial media, website(s), and the like.

Communication system 100 also includes an aggregator 210, filter module 220, analysis module 230, artificial intelligence module 240, login module 250, response formulation module 260, knowledge base 270, one or more customer service agents (280-284) and an auto response module 290, all connected to an interaction center 200 that is connected via one or more links 5 and networks 10 to the information sources.

In addition, the communications system 100 can include, for example, a text-to-speech (TTS) module, a speech-to-text (STT) module, a media translation module that, for example, allows translation of a video into a speech description thereof, and the like.

In operation, information from one or more of the information sources is forwarded, via links 5 and network 10, to the aggregator 210. As discussed, the information from the information sources can be gathered with the assistance of one or more of RSS/Atom feeds, APIs, or in conjunction with a searching and alerting tool that searches for specified predefined terms and delivers the results, for example, via an email, SMS, or RSS/Atom feed, to the aggregator 210. This same technology could be applied to any type of multimedia content. For example, a company can enter their company name, product names, service names or the like, and have this alerting and forwarding service provide the information that contains any of these key terms to the aggregator 210. The form of the supplied information can be in one or more of textual, an email, a hyperlink, an SMS, an HTML-based communication, an RSS feed, via an API (Application programming Interface), or the like.

The interaction center 200 can in general be associated with any one or more information sources, that include any type of information via text, multimedia-based, video, a combination of text and graphics, and the like. Once these associations are made, the aggregator 210 begins receiving the information from the various information sources and aggregates all the disparate feeds. However, the interaction center 200 need not necessarily be associated with an information source to receive information therefrom. As discussed above, an agent could scan the internet, or a portion thereof, looking for one or more terms that could trigger the forwarding of the discovered information to the aggregator 210.

Appreciating that all this information may or may not require a response, the filter module 220, cooperating with the analysis module 230 and AI module 240 filters the aggregated information before forwarding it to the interaction center 200. More specifically, a first determination by the analysis module 230 could be whether or not the question or comment was already responded to. Another analysis could be whether the information is the type of information that does not require a response. Examples of this include, but are not limited to, press releases, general news articles, or in general any content that does not necessarily require a response. To assist with this analysis, the AI module 240 can include a dynamic feedback such that historical responses made on behalf of the interaction center 200 can also be used to determine whether the filtering module 220 should filter out the information, or pass it on to the interaction center 200.

For example, if a company releases a press release that is then disseminated to multiple information sources on the Internet, the aggregator 210 will probably receive these press releases in that one or more keywords are present therein that triggers the aggregator 210 to forward that information to the filter module 220. In this particular instance, since it is the company's own press release, clearly the company may not need to provide any response to that press release being published on multiple websites. If however a disgruntled customer is posting multiple complaints on multiple different information sources, not only would the aggregator 210 forward that to the filter module 220 for analysis, but in cooperation with the AI module 240, this particular complaint could optionally be flagged with a high priority flag for expedited handling by the interaction center 200.

In accordance with another exemplary embodiment, the filter module 220 cooperates with the analysis module 230 and artificial intelligence model 240 as well as information in knowledge base 270, to assist with determining whether a particular comment/question has already been answered. To help ensure that what appears to be a duplicate comment/question has already been answered, the analysis module 230 and AI module 240 could analyze one or more portions of the question/comment such as poster, IP address associated with the poster, subject line, content, signature, metadata, and in general any information associated with the comment/question. One or more portions of this information can be compared to information stored in knowledge base 270 with, for example, a weighting assigned that upon a certain number of these criteria matching, the determination made that the question/comment has already been responded to. If the question has already been responded to, the interaction center 200, cooperating with the auto response module 290, can optionally copy the previous answer to the information source as a reply. To perform this action, interaction center 200, cooperating with the login module 250, retrieves information about the source and the necessary login information if it is needed. The auto response module 290, cooperating with the interaction center 200 and knowledge base 270, can submit the response e.g., post a reply, on the source, that can optionally be reviewed before the reply is posted. In addition, this action can optionally be logged in the knowledge base 270 and, in cooperation with the interaction center 200 flagged for follow-up.

For example, the knowledge base 270 can track responses that are posted on one or more of the information sources. Then, cooperating with the interaction center 200, at a specified date and time, the interaction center 200 could forward, for example, a link to an appropriate customer service agent that allows follow-up to the previously posted response. This can be performed dynamically with the interaction center 200 checking to see if any further responses have been posted subsequent to the response being posted. If no subsequent responses have been posted, and in cooperation with the filter module 220, this flag could be removed or pushed forward to a future date for a subsequent follow-up.

If the question/comment has not already been answered, the next determination is whether an answer is required. For example, the filter module 220, again cooperating with the analysis module 230 and AI module 240, can analyze the nature of the post and determine, for example, whether it is a question, whether it is a general comment, whether it is complementary or derogatory in nature, whether it is the type of question the interaction center 200 should respond to, and in general whether it is the type of post that a user, such as a company, should respond to.

If it is the type of posting that warrants a response, several different options are available for handling that response. As previously discussed, one option would be to copy a previous answer and post it as a reply. This reply could optionally be customized with the auto response module 290 cooperating with the response formulation module 260. For example, a greeting could be specified based on, for example, information derived from the original posting as well as such things as formatting, font, style and the like customized based on, for example, the particular information source to which the response is being uploaded to. In addition, standard information such as company name, contact information, as well as advertising could also be associated with a response posted by the interaction center 290.

Another determination that filter module 220, cooperating with the analysis module 230 and AI module 240 could make, is whether agent assistance, such as a customer service agent (280-284), is required. This determination can be made, for example, based on whether interaction center 200, cooperating with the response formulation module 260, knowledge base 270, and auto response module 290 is able to formulate a response, based on a set of rules, to a question or comment. Additional factors that could be taken into consideration whether agent assistance is required, is, for example, whether or not multiple posts are being received from multiple information sources regarding the same topic or from the same poster. Other criteria that can be used to assist with whether agent assistance is required is whether or not the question or comment relates to a company sensitive issue, a priority associated with a particular topic or subject matter, the level of complexity of the comment or question, whether or not the analysis module 230 and artificial intelligence module 240 are able to determine what the comment or question is about, or the like. If it is determined that neither an automated response, nor agent handling is required, the determination to make this decision, and the information surrounding the making of that decision, can be logged with a process ending.

Alternatively, if it is determined that agent assistance is required, the skills required to address the question or comment are determined and then the question or comment forwarded to an agent queue for handling by a customer service agent 280-284. These skills-based-routing queues can be established in a similar manner to call center architectures where multiple customer service agents, generally with specific skill sets, are assigned to a specific queue to handle a specific type of issue. One or more of the customer service agents can then make a determination as to whether a response is required. If a response is not required, the process can end with the option of the determination of a response not being required, logged. Otherwise, a determination can be made whether an automatic response could be used.

If a comment or question is placed in the auto response queue, similar to the process above described in relation to copying a previous answer to the source as a reply to an already answered question or responded to comment, the auto response module 290 can determine an appropriate response. For example, if the exact same question had not already been answered, or, for example, a different response is required for the same question, the auto response module 290 can determine an appropriate response with, for example, the cooperation of the response formulation module 260 and knowledge base 270. Once an appropriate response is determined, source information is retrieved that includes sufficient information to allow the auto response module 290, in cooperation with the interaction center 200, to post the response on the information source. In addition, and if required, login information for the source can be obtained, that includes, for example, login name and password. Before the auto response module 290 posts the response, the response can optionally be reviewed, for example, by a user, such as another customer service agent, who has the option of authorizing the posting of the response.

The response can then be submitted with the response optionally being logged. Furthermore, and as discussed, the response can be flagged with a tag for following up at a later time.

If agent assistance is required, and once the comment or question is placed in the appropriate queue for response, the question or comment remains in that queue until a customer service agent receives the question or comment. An initial check by the customer service agent (280-284) can be whether or not the comment or question is in the appropriate queue. If the comment or question is not in the appropriate queue, the customer service agent can reassign the question or comment to an appropriate queue. Otherwise, the customer service agent can determine an appropriate answer, utilizing additional outside resources if required. Having determined the appropriate answer, the customer service agent cooperating with the interaction center 200 and login module 250 obtains the necessary login information for the source. Additionally, before the response is submitted, the responsible customer service agent can cooperate with the response formulation module 260 to determine whether or not the response is in the appropriate format for the particular source to which the response will be posted. As with the other type of responses, this response can optionally be reviewed by, for example, a peer or supervisor, prior to posting of the response on the source.

Additionally, the response can be logged and tagged for follow-up as discussed herein.

Figure 2:
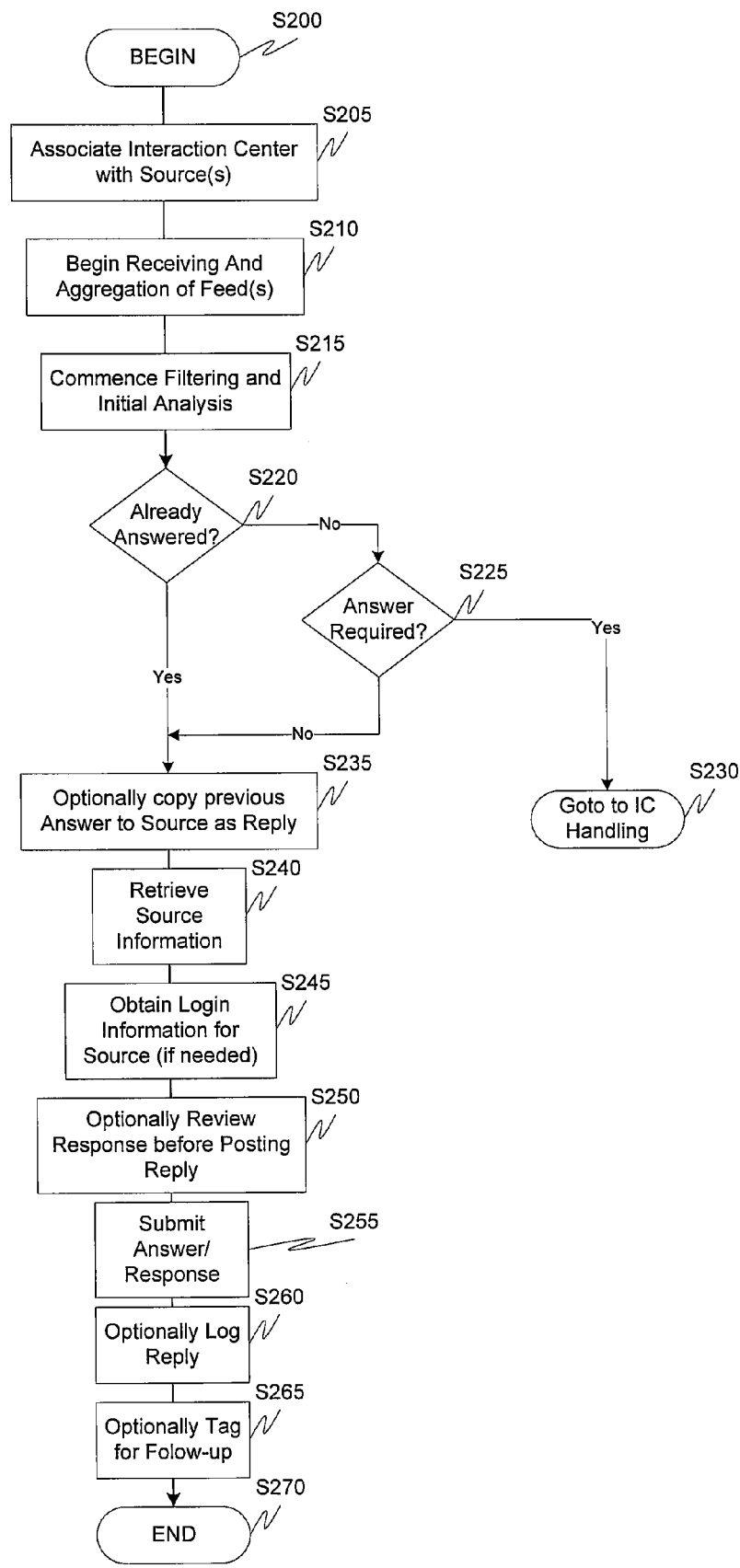
FIG. 2 is a flowchart outlining an exemplary method for filtering information received from the Internet according to this invention.

FIG. 2 outlines an exemplary method of aggregating and filtering questions or comments according to this invention. In particular control begins in step S200 and continues to step S205. In step S205, an interaction center is associated with one or more sources. As discussed, these sources can include one or more of logs, discussion forums, social networking sites, news feeds, web feeds, video feeds, discussion groups, sites having an API, and the like. Optionally, this association need not necessarily be performed but rather an interaction center could be provided with a tool that goes out and searches numerous information sources for specific key words. Upon finding one or more of these key words, a link, such as in an email, IM, or comparable message, could be forwarded from the tool to the interaction center. Then, in step S210, the interaction center begins receiving and aggregating the various feeds of information from the information sources. Control then continues to step S215.

In step S215, the interaction center commences filtering and an initial analysis of the information from the various sources. Next, in step S220, a determination is made whether a response has already been provided. If a response has been provided, control continues to step S235. Otherwise, control jumps to step S225. In step S225, a further determination is made whether an answer is required. If an answer is required, control continues to step S230.

Otherwise, control continues to step S235 where a copy of the previous answer can be copied to the source as a reply. Control then continues to step S240.

In step S240, information pertaining to the source can be retrieved. This information includes, for example, IP address or URL, thread identifier, or in general any information used to identify the location of the question or comment. Then, if required, login information for the particular source is obtained with the answer optionally being reviewed before it is posted as an answer in step S250.

Control then continues to step S255.

In step S255, the response or answer is submitted. Next, in step S260, the answer or response is optionally logged, and, in step S265, optionally tagged for follow-up. Control then continues to step S270 where the control sequence ends.

Figure 3:
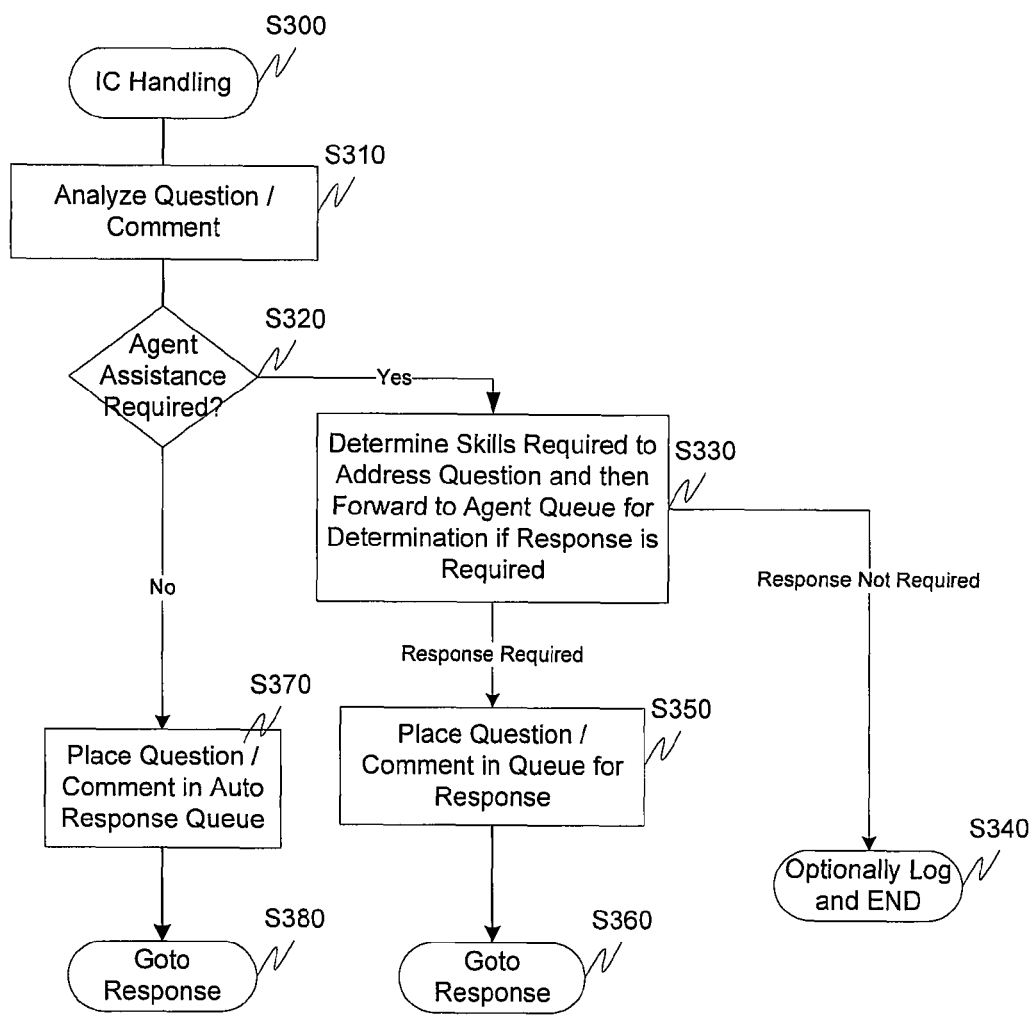
FIG. 3 is a flowchart outlining an exemplary method for interaction center handling according to this invention.

FIG. 3 outlines an exemplary method of analyzing a question or comment according to this invention. In particular, control begins in step S300 and continues to step S310. In step S310, the question or comment is analyzed. Next, in step S320, a determination is made whether agent assistance is required. If agent assistance is required, control continues to step S330. Otherwise, control jumps to step s370.

In step S330, the various skills required to address the question or comment are determined, and then the question or comment is forwarded to an agent queue for determination if a response is required. If a response is not required, control continues to step S340 where the decision not to respond can optionally be logged and the control sequence ends.

Otherwise, if a response is required, control continues to step S350 where the question or comment is placed in an appropriate queue for an answer or response. Control then continues to step S360.

In step S370, and if agent assistance is not required, the comment or question can be placed into the auto response queue with control continuing to step S380 where the control sequence ends.

Figure 4:
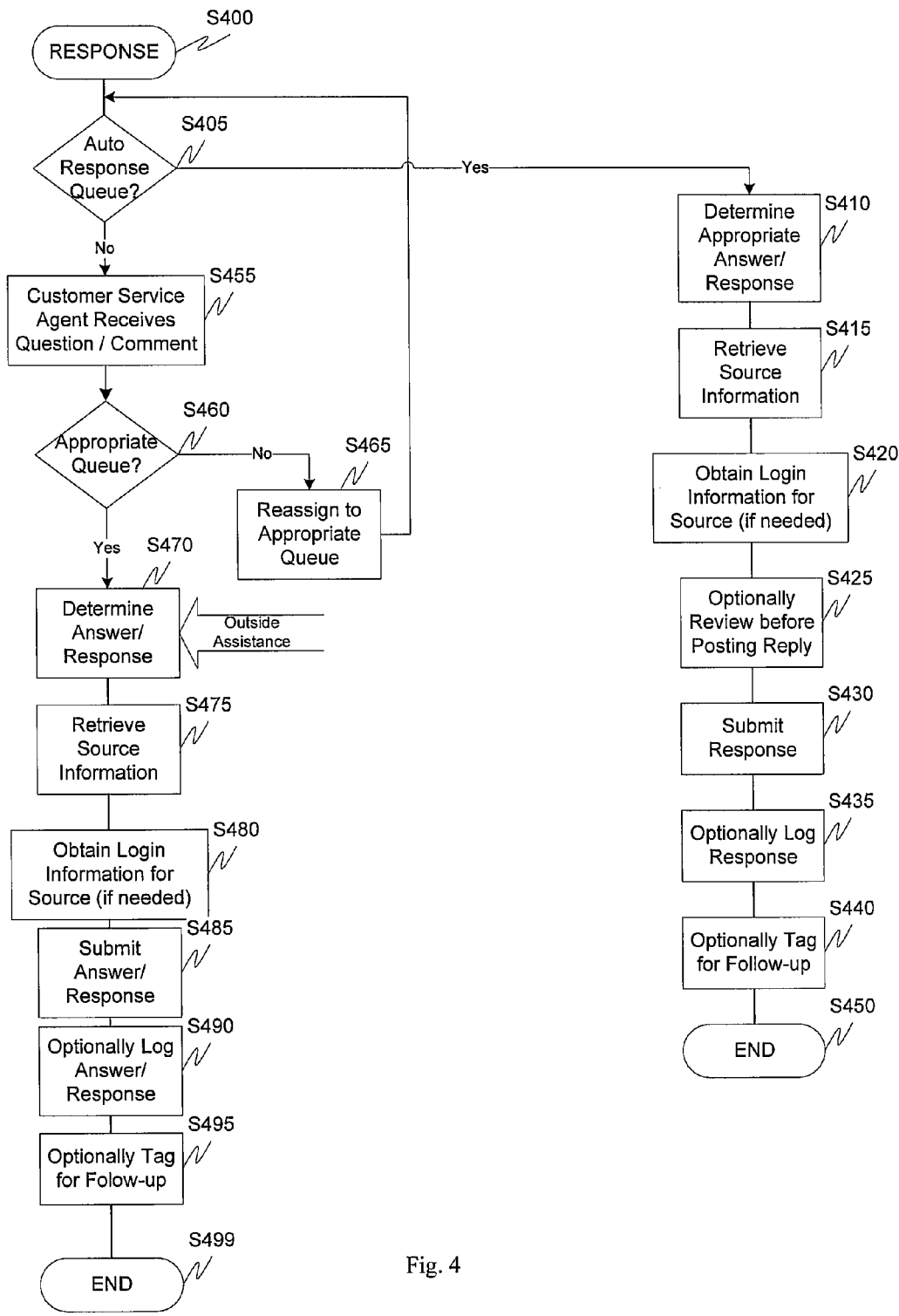
FIG. 4 is a flowchart outlining an exemplary method for auto responding according to this invention.

FIG. 4 outlines an exemplary method of responding according to this invention. In particular, control begins in step S400 and continues to step S405. In step S405, a determination is made whether the question or comment is in the auto response queue. If the question or comment is in the auto response queue, control continues to step S410 with control otherwise jumping to step S455.

In step S410, an appropriate response is determined. As discussed, this response can be based on one or more of information in a knowledge base, artificial intelligence, analysis of historical information and responses, and in general any information available to the auto response module. Next, in step S415, source information is retrieved to allow posting of the derived response in the appropriate location. Then, in step S420, login information if needed is obtained to assist with posting of the response. Control continues to step S425.

In step S425, the response can optionally be reviewed before it is posted. This review can be one or more of automatic or manual and the interaction center may have a dedicated queue into which auto formulated responses are placed for approval prior to posting. Once ready, the response is submitted in step S430 with control continuing to step S435 where the response is optionally logged and in step S440 where the response is optionally tagged for follow-up. Control then continues to step S450 where the control sequence ends.

In step S455, a customer service agent receives the comment or question. Next, in step S460 the customer service agent determines whether or not the question or comment is in the appropriate queue. If the question or comment is not in the appropriate queue, control jumps to step S465 where the question or comment can be assigned to a new queue with control jumping back to step S405. Otherwise, control continues to step S470 where the customer service agent determines an appropriate answer. Next, in step S475, source information is retrieved that allows the posting of the determined answer in the appropriate location. Then, in step S480, login information is optionally obtained to allow login to the information source. Then, in step S485, the response is submitted. As with the other types of response, the generated response in step S470 can optionally be reviewed by a peer or a supervisor of the like, for approval. Control then continues to step S490. In step S490, the response is optionally logged and optionally tagged for follow-up in step S495. Control then continues to step S499 where the control sequence ends.

In accordance with an exemplary embodiment that uses, for example, a bulletin board service (BBS) to allow various users to post information in a web forum, the response by the interaction center could operate as follows. For example, in an HTML-based environment, the thread ID associated with a comment or question could be similar to the following:

http://forum.xyzforum.com/tech/will-productx-work-with-product-y.html

This URL identifies the message thread by a unique ID (will-productx-work-with-product-y.html) which can be used by the interaction center to facilitate posting of a response to a question or comment therein. More specifically, and if a login is required, a customer service agent could manually enter the login and password information provided by the login module into the appropriate form fields in the HTML page. Alternatively, and if for example the interaction center is automatically responding to a question or comment, the auto response module, in cooperation with the login module, could parse the HTML page and determine where the form tag is into which the login and password information is entered. Specifically, the login module could tab through the HTML source and find the "form action" code and then automatically insert the user name and password in the appropriate form fields. For example, the form action tag could be similar to:

```
<form action="http://forum.xyzforum.com/login.php?do=login"
method="post" onsubmit="md5hash(vb_login_password,
vb_login_md5password, vb_login_md5password_utf, 0)">
```

Entry of the answer or response can be performed in a similar manner. For example, for a customer service agent, the customer service agent can scroll down to the text entry field that allows entry of the response or answer. Upon completion of this response or answer, the customer service agent could click the "post reply" button at which point the reply would be posted in the corresponding thread.

If the response or reply is automated, the auto response module could look for the text entry field by searching for, for example, the field set tags as illustrated below where the message is entered.

```
<div class="smallfont">Message:</div>
<div id="vB_Editor_QR" class="vBulletin_editor">
<fieldset style="border:0px; padding:0px; margin:0px">
<textarea name="message" id="vB_Editor_QR_textarea" rows="10"
cols="60" style="width:100%; height:100px" tabindex="1" dir="ltr">
</textarea>
</fieldset>
```

Then, in a similar manner, the auto response module could tab through to find the "form action" tag where the "method=post" action is selected to submit the reply to the forum (See example below). Similar methodologies can be used for the various types of information sources, with the identification of the various fields adjusted to accommodate for the type of information source onto which the response or answer will be posted. These basic concepts can also be extended to specialized or custom APIs with one or more of the auto response module, login module, and customer service agent navigating to the appropriate portion of the graphical user interface and entering the appropriate information, and selecting the appropriate button to facilitate one or more of login, posting of a reply, or the like.

<form action="http://forum.xyzforum.com/newreply.php?do=postreply&t=282212"method= "post"name="vbform"onsubmit="return qr_prepare_submit(this, 5);"id="qrform">

A number of variations and modifications of the invention can be used. It would be possible to provide or claim for some features of the invention without providing or claiming others.

The exemplary systems and methods of this invention have been described in relation to customer service 2.0. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. An enhanced customer service method comprising:
    performing a web search to search for, identify, retrieve and aggregate a plurality of messages that were posted on the internet in one or more of a blog, discussion forum, social networking site, news feed, web feed, blog feed, video feed, group feed and an RSS feed, the plurality of messages:
        being from at least two different sources,
        being identified and retrieved based on an identification of one or more predefined terms contained in the message, and
        being one or more message types;
    filtering only the retrieved plurality of messages which contain the one or more predefined terms, wherein filtering the retrieved plurality of messages which contain the one or more predefined terms further comprises:
        determining that at least one of the retrieved plurality of messages which contain the one or more predefined terms is a press release of a company; and
        in response to determining that the at least one of the retrieved plurality of messages which contains the one or more predefined terms is a press release of the company, filtering out the at least one of the retrieved plurality of messages that is the press release of the company;
    analyzing, using a processor and analysis module, the content of the plurality of retrieved messages; and
    based on the analysis, performing one or more of:
        automatically responding to one or more of the plurality of messages,
        forwarding one or more of the plurality of messages to a customer service agent, and
        logging an indication of any action taken in response to the receipt, filtering and analysis of one or more of the plurality of messages.

2. The method of claim 1, wherein the different sources are one or more of blogs, discussion forums, social networking sites, news feeds, web feeds, blog feeds, video feeds, group feeds, RSS feeds and internet-based sites with an API and the message types include one or more of text, multimedia, video and a combination of text and graphics.

3. The method of claim 1, further comprising routing one or more of the plurality of messages to an appropriate queue for handling by the customer service agent.

4. The method of claim 1, wherein the analysis includes one or more of determining if a response has already been provided, determining a priority for one or more messages, determining if one or more of the plurality of messages are sensitive, determining if one or more of the plurality of messages requires a response, determining if one or more of the plurality of messages are from the same person, determining if one or more of the plurality of messages include one or more keywords and comparing content of one or more of the plurality of messages to information in a knowledge base.

5. The method of claim 1, further comprising automatically formulating a response to one or more of the plurality of messages.

6. The method of claim 1, further comprising maintaining login information for one or more information sources from which the plurality of messages are received.

7. The method of claim 1, further comprising utilizing an API (Application Program Interface) to interact with an information source from which the plurality of messages are received.

8. The method of claim 1, wherein the forwarding to the customer service agent is based on skills-based routing techniques.

9. A non-transitory computer-readable storage media having stored thereon instructions, that when executed by a processor, perform the steps of claim 1.

10. A system for enhanced customer service, the system comprising:
   means for performing a web search to search for, identify, retrieve and aggregate a plurality of messages that were posted on the internet in one or more of a blog, discussion forum, social networking site, news feed, web feed, blog feed, video feed, group feed and an RSS feed, the plurality of messages:
      being from at least two different sources,
      being identified and retrieved based on an identification of one or more predefined terms contained in the message, and
      being one or more message types;
   means for filtering only the retrieved plurality of messages which include the one or more predefined terms, wherein filtering the retrieved plurality of messages which include the one or more predefined terms further comprises:
      determining that at least one of the retrieved plurality of messages which include the one or more predefined terms is a press release of a company; and
      in response to determining that the at least one of the retrieved plurality of messages which contains the one or more predefined terms includes a press release of the company, filtering out the at least one of the retrieved plurality of messages that includes the press release of the company;
   means for analyzing, using a processor and analysis module, the content of the plurality of retrieved messages; and
   based on the analysis, means for performing one or more of:
      automatically responding to one or more of the plurality of messages,
      automatically forwarding one or more of the plurality of messages to a customer service agent, and
      automatically logging an indication of any action taken in response to the receipt, filtering and analysis of one or more of the plurality of messages.

11. An enhanced customer service system comprising:
   an aggregator that performs a web search to search for, identify, retrieve and aggregate plurality of messages that were posted on the internet in one or more of a blog, discussion forum, social networking site, news feed, web feed, blog feed, video feed, group feed and an RSS feed, the plurality of messages:
      being from at least two different sources,
      being identified and retrieved based on an identification of one or more predefined terms, and
      being one or more message types;
   a filter module that filters only the plurality of retrieved messages which include the one or more predefined terms, determines that at least one of the retrieved plurality of messages which include the one or more predefined terms is a press release of a company, and in response to determining that the at least one of the retrieved plurality of messages which includes the one or more predefined terms is a press release of the company, filters out the at least one of the retrieved plurality of messages that is the press release of the company;
   a processor and one or more of an analysis module and artificial intelligent module that, using the processor, analyze the content of the plurality of retrieved messages, and, based on the analysis:
      an auto response module automatically responds to one or more of the plurality of messages,
      an interaction center forwards one or more of the plurality of messages to a customer service agent, or
      a logging module logs an indication of any action taken in response to the receipt, filtering and analysis of one or more of the plurality of messages.

12. The system of claim 11, wherein the different sources are from one or more of blogs, discussion forums, social networking sites, news feeds, web feeds, blog feeds, video feeds, group feeds, RSS feeds and internet-based sites with an API and the message types include one or more of text, multimedia, video and a combination of text and graphics.

13. The system of claim 11, wherein the interaction center routes one or more of the plurality of messages to an appropriate queue for handling by the customer service agent.

14. The system of claim 11, wherein the analysis includes one or more of determining if a response has already been provided, determining a priority for one or more of the plurality of messages, determining if one or more of the plurality of messages are sensitive, determining if one or more of the plurality of messages requires a response, determining if one or more of the plurality of messages are from the same person, determining if one or more of the plurality of messages include one or more keywords and comparing content of one or more of the plurality of messages to information in a knowledge base.

15. The system of claim 11, further comprising a response formulation module that cooperates with the auto response module to automatically formulate a response to one or more of the plurality of messages.

16. The system of claim 11, wherein login information for one or more information sources from which the plurality of messages are received is stored in a login module.

17. The system of claim 11, wherein the interaction center utilizes an API to interact with an information source from which the plurality of messages are received.

18. The system of claim 11, wherein the forwarding to the customer service agent is based on skills-based routing techniques.

19. The system of claim 11, further comprising a knowledge base that is used to assist with the filtering, analysis, auto response and routing.

20. The system of claim 11, wherein one or more of the plurality of messages are automatically received by the aggregator.

* * * * *